(12) United States Patent
Zhang et al.

(10) Patent No.: US 12,177,664 B2
(45) Date of Patent: Dec. 24, 2024

(54) NETWORK ROAMING METHOD, TERMINAL DEVICE, AND COMPUTER READABLE STORAGE MEDIUM

(71) Applicant: Shenzhen uCloudlink Network Technology Co. Ltd., Guangdong (CN)

(72) Inventors: Ziran Zhang, Guangdong (CN); Zhihui Gong, Guangdong (CN)

(73) Assignee: Shenzhen uCloudlink Network Technology Co. Ltd., Guangdong (CN)

(*) Notice: Subject to any disclaimer, the term of this patent is extended or adjusted under 35 U.S.C. 154(b) by 382 days.

(21) Appl. No.: 17/844,115

(22) Filed: Jun. 20, 2022

(65) Prior Publication Data

US 2022/0322088 A1 Oct. 6, 2022

Related U.S. Application Data (63) Continuation-in-part of application No. PCT/CN2020/132851, filed on Nov. 30, 2020.

(30) Foreign Application Priority Data

Dec. 20, 2019 (CN) .......................... 201911324007.8

(51) Int. Cl.
*H04W 12/06* (2021.01)
*H04W 12/40* (2021.01)
*H04W 60/00* (2009.01)

(52) U.S. Cl.
CPC ........... *H04W 12/06* (2013.01); *H04W 12/40* (2021.01); *H04W 60/00* (2013.01)

(58) Field of Classification Search
CPC ..... H04W 12/06; H04W 12/40; H04W 60/00; H04W 8/12; H04W 8/183; H04W 8/02
See application file for complete search history.

(56) References Cited

U.S. PATENT DOCUMENTS 10,567,350 B2 2/2020 Sui
10,897,704 B2 1/2021 Bai
(Continued)

FOREIGN PATENT DOCUMENTS

CN 101222712 A 7/2008
CN 103987025 A 8/2014
(Continued)

OTHER PUBLICATIONS

Z. Gang, et al., Design and implementation of virtual SIM card based Off Android platform, Application of Electronic Technique, 2018, 44(7) pp. 122-126.

*Primary Examiner* — Dhaval V Patel
(74) *Attorney, Agent, or Firm* — Brooks Kushman P.C.

(57) ABSTRACT

A network roaming method is provided, this method includes: when a first determination condition is met, a user's SIM card is deactivated and a seed SIM card is activated, and a network registration for the seed SIM card is performed; after the network registration for the seed SIM card is completed, a data dialing is performed on the seed SIM card; after the data dialing is successfully performed, a cloud SIM card allocation request is submitted through a data traffic of the seed SIM card, the cloud SIM card is obtained and activated, and a network registration for the cloud SIM card is performed; after the network registration for the cloud SIM card is completed, a data dialing is performed on the cloud SIM card, the seed SIM card is deactivated and the user's SIM card is activated after the data dialing is successfully performed.

9 Claims, 4 Drawing Sheets

(56) References Cited

U.S. PATENT DOCUMENTS

| | | | | |
|---|---|---|---|---|
| 2013/0227137 A1* | 8/2013 | Damola | ................... | H04L 47/78 |
| | | | | 709/224 |
| 2015/0245195 A1* | 8/2015 | Zhao | ..................... | H04W 12/37 |
| | | | | 455/418 |
| 2016/0050556 A1 | 2/2016 | Zhao et al. | | |
| 2016/0309326 A1 | 10/2016 | Lian | | |
| 2020/0322782 A1* | 10/2020 | Gong | ..................... | H04W 8/205 |
| 2020/0344597 A1* | 10/2020 | Bai | ........................ | H04W 8/265 |
| 2021/0105609 A1* | 4/2021 | Park | ...................... | H04W 8/183 |

FOREIGN PATENT DOCUMENTS

| | | | |
|---|---|---|---|
| CN | 105101153 | A | 11/2015 |
| CN | 105263140 | A | 1/2016 |
| CN | 105491555 | A | 4/2016 |
| CN | 105554718 | A | 5/2016 |
| CN | 106998547 | A | 8/2017 |
| CN | 107306387 | A | 10/2017 |
| CN | 207053557 | U | 2/2018 |
| CN | 110557747 | A | 12/2019 |

\* cited by examiner

NETWORK ROAMING METHOD, TERMINAL DEVICE, AND COMPUTER READABLE STORAGE MEDIUM

CROSS-REFERENCE TO RELATED APPLICATIONS

This application is a continuation-in-part of PCT patent application Serial No. PCT/CN2020/132851, filed on Nov. 30, 2020, which claims priority to Chinese patent application No. 201911324007.8 filed with CNIPA on Dec. 20, 2019, the entire contents of which are incorporated herein by reference thereto.

TECHNICAL FIELD

The present application relates to the technical field of communications, and more particularly to a network roaming method, a terminal device, and a computer-readable storage medium.

DESCRIPTION OF RELATED ART

With the continuous improvement of development level of science and technology, wireless networks are more and more commonly used in people's daily lives, a terminal device is provided with the capability of mobile communication within a coverage of a wireless network, the terminal device is usually spanned from from one network service area to another network service area in a moving process of a user of the terminal device, in order to avoid a disconnection of network communication when the terminal device switches networks between different service areas, a concept of wireless roaming is introduced; however, a roaming agreement between different network carriers is needed for roaming between the networks of different network carriers, and a very expensive roaming charge may be generated in the roaming process of the terminal device between the networks of different carriers.

SUMMARY

In view of this, the embodiments of the present application provide a network roaming method, a terminal device and a non-transitory computer-readable storage medium, which aim to solve the problem of high roaming charges of the existing mobile networks.

In the first aspect, a network roaming method is provided in one embodiment of the present application, this method is implemented by a terminal device and includes steps of:
deactivating a user's SIM card and activating a seed SIM card, and performing a network registration for the seed SIM card by the terminal device when a first determination condition is met;
performing a data dialing on the seed SIM card by the terminal device when the network registration for the seed SIM card is completed, and submitting a cloud SIM card allocation request from the terminal device to a cloud SIM card server through a data traffic of the seed SIM card, after the data dialing performed on the seed SIM card is successfully performed;
obtaining a cloud SIM card by the terminal device according to a cloud SIM card allocation result from the cloud SIM card server, activating the cloud SIM card, and performing a network registration for the cloud SIM card by the terminal device; and performing a data dialing on the cloud SIM card by the terminal device when the network registration for the cloud SIM card is completed, and deactivating the seed SIM card and activating the user's SIM card by the terminal device, after the data dialing performed on the cloud SIM card is successfully performed.

Furthermore, the step of performing the network registration for the cloud SIM card includes:
sending a registration request of a cloud SIM card to a network and receiving cloud SIM card authentication request information sent from the network by the terminal device;
sending, by the terminal device, through the data traffic of the seed SIM card, the cloud SIM card authentication request information to the cloud SIM card server to perform an authentication on the cloud SIM card, and obtaining a cloud SIM card authentication result from the cloud SIM card server by the terminal device after the authentication on the cloud SIM card is performed by the cloud SIM card server;
sending, by the terminal device, the authentication result of the cloud SIM card to the network in order that the network passes the registration request of the cloud SIM card when the authentication result of the cloud SIM card conforms to an expected result of the network; and
successfully performing the network registration for the cloud SIM card after the registration request of the cloud SIM card is passed by the network.

Furthermore, after the step of activating the cloud SIM card by the terminal device and the before the step of performing the network registration for the cloud SIM card by the terminal device, the method further includes:
switching the data traffic of the seed SIM card to the cloud SIM card and performing a data dialing on the seed SIM card again by the terminal device.

Furthermore, after the step of performing the data dialing on the cloud SIM card by the terminal device when the network registration for the cloud SIM card is successfully performed, and deactivating the seed SIM card and activating the user's SIM card by the terminal device after the data dialing performed on the cloud SIM card is successfully performed, the method further includes:
receiving, by the terminal device, the cloud SIM card authentication request information sent from the network during normal use of the cloud SIM card and the user's SIM card;
deactivating the user's SIM card and activating the seed SIM card by the terminal device, and performing the network registration for the seed SIM card after receiving the cloud SIM card authentication request information sent from the network;
performing the data dialing on the seed SIM card by the terminal device after the network registration for the seed SIM card is completed;
sending, by the terminal device, the cloud SIM card authentication request information to the cloud SIM card server through the data traffic of the seed SIM card so as to perform an authentication on the cloud SIM card after the data dialing is successfully performed, and obtaining an authentication result of the cloud SIM card from the cloud SIM card server; and
sending the authentication result of the cloud SIM card to the network by the terminal device, deactivating the seed SIM card and activating the user's SIM card by the terminal device when the authentication result of the cloud SIM card conforms to the expected result of the network and the authentication on the cloud SIM card is passed by the cloud SIM card server.

In the second aspect, a terminal device is provided in one embodiment of the present application, the terminal device includes: a processor, a memory coupled with the processor and a computer program stored in the memory and executed by the processor, the processor is configured to execute the computer program in the memory to:

deactivate a user's SIM card and activate a seed SIM card, and perform a network registration for the seed SIM card when a first determination condition is met;

perform a data dialing on the seed SIM card when the network registration for the seed SIM card is completed, and submit a cloud SIM card allocation request from the terminal device to a cloud SIM card server through a data traffic of the seed SIM card, after the data dialing performed on the seed SIM card is successfully performed;

obtain a cloud SIM card according to a cloud SIM card allocation result from the cloud SIM card server, activate the cloud SIM card, and perform a network registration for the cloud SIM card; and perform a data dialing on the cloud SIM card when the network registration for the cloud SIM card is completed, and deactivate the seed SIM card and activate the user's SIM card after the data dialing performed on the cloud SIM card is successfully performed.

In the third aspect, one embodiment of the present application provides a non-transitory computer readable storage medium that, when executed by a processor, causes the processor to implement the following steps, including:

deactivating a user's SIM card and activating a seed SIM card, and performing a network registration for the seed SIM card when a first determination condition is met;

performing a data dialing on the seed SIM card when the network registration for the seed SIM card is completed, and submitting a cloud SIM card allocation request to a cloud SIM card server through a data traffic of the seed SIM card, after the data dialing performed on the seed SIM card is successfully performed;

obtaining a cloud SIM card according to a cloud SIM card allocation result from the cloud SIM card server, activating the cloud SIM card, and performing a network registration for the cloud SIM card; and performing a data dialing on the cloud SIM card when the network registration for the cloud SIM card is completed, and deactivating the seed SIM card and activating the user's SIM card after the data dialing performed on the cloud SIM card is successful.

According to the embodiment of the present application, when the first determination condition is met, the user's SIM card is deactivated and the seed SIM card is activated, and network registration is performed for the seed SIM card; after the network registration for the seed SIM card is completed, the data dialing is performed on the seed SIM card; after the data dialing is successfully performed, the cloud SIM card allocation request is submitted through the data traffic of the seed SIM card, the cloud SIM card is obtained and activated, and then the network registration for the cloud SIM card is performed; and after the network registration for the cloud SIM card is completed, the data dialing is performed on the cloud SIM card; after the data dialing performed on the cloud SIM card is successfully performed, the seed SIM card is deactivated and the user's SIM card is activated. In the aforesaid process, the seed SIM card is used to provide data traffic service for the allocation and the network registration of the cloud SIM card, so that the cloud SIM card is activated, and a roaming charge during the roaming process of the mobile network is avoided.

BRIEF DESCRIPTION OF THE DRAWINGS

In order to describe the technical solutions in the embodiments of the present application more clearly, a brief introduction regarding the accompanying drawings that need to be used for describing the embodiments or the related art is given below; it is obvious that the accompanying figures described below are merely some embodiments of the present application, the person of ordinary skill in the art can also obtain other drawings according to the current drawings without paying creative labor.

DETAILED DESCRIPTION

In order to make the ordinarily skilled one in the art to understand the technical solutions of the present application better, the technical solutions in the embodiments of the present application will be described in detail below with reference to the accompanying drawings in the embodiments of the present application. It is apparent that, the embodiments described below are merely some embodiments of the present application, rather than all of the embodiments. Based on the embodiments in the present application, other embodiments, which are obtained by the person of ordinary skill in the art at without paying creative labor, should all be included in the protection scope of the present application.

Terms of "comprising/including" and any modification thereof in the description, claims and the aforesaid accompanying drawings are intended to cover non-exclusive inclusion, such as including a process of a series of steps or units, a method or a system, a product or a device, which is not limited to the listed steps or units, but In one preferable embodiment further includes the steps or units that are not listed, or In one preferable embodiment further includes other steps or elements inherent to these processes, method, product or device. In addition, terms of "first", "second", and "third" are configured to discriminate different objects rather than describing a particular order.

Embodiment One

Figure 1:
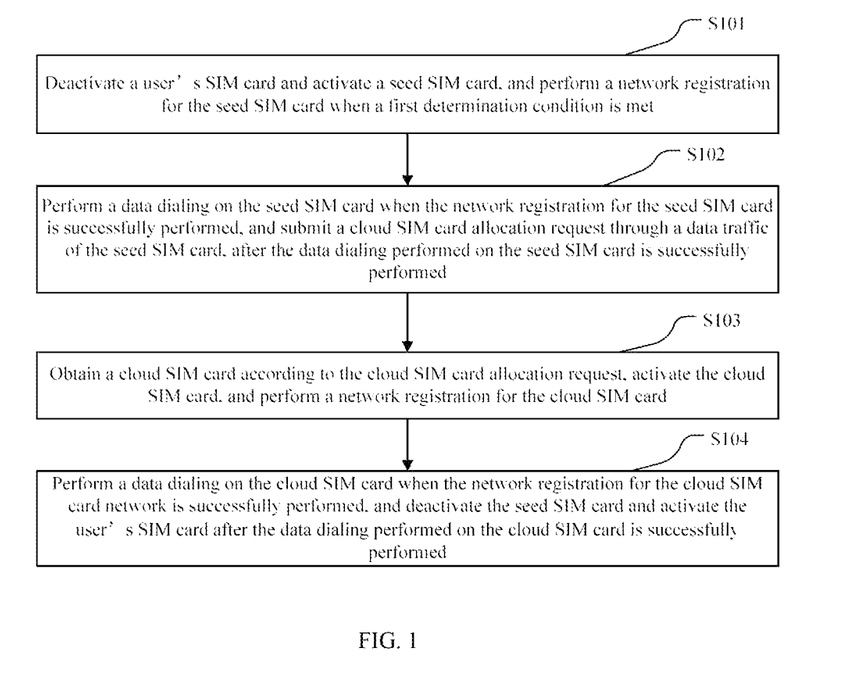
FIG. 1 illustrates a schematic flowchart of a network roaming method according to embodiment one of the present application.

As shown in FIG. 1, FIG. 1 illustrates a schematic flowchart of a network roaming method according to embodiment one of the present application, this network roaming method is implemented by a terminal device and may include:

At step S101, when a first determination condition is met, the user's SIM card is deactivated and the seed SIM card is activated by the terminal device, and a network registration for a seed SIM card is performed by the terminal device.

In one specific application, if a current state of the terminal device meets the first determination condition, it indicates that an activation process of the cloud SIM card is started, this is because that a data traffic of the seed SIM card needs to be used in the subsequent operation, the user's SIM card needs to be deactivated and the seed SIM card needs to be activated, if the seed SIM card needs to be used, network registration for the seed SIM card needs to be performed. Where the first determination condition are different according to different settings of the terminal device, where the settings includes activating the cloud SIM card when the terminal device is started or activating the cloud SIM card during a standby process of the terminal device, setting a manner for switching between an activated state of the cloud SIM card and a deactivated state of the cloud SIM card according to subscriber's automatic control, etc., furthermore, in the setting process, the seed SIM card may be inserted into the terminal device in advance; the aforesaid user's SIM card refers to one SIM card allocated to and used by the subscriber himself/herself, and the main function of the SIM card is to provide services such as data, language and short message for the subscriber; The aforesaid seed SIM card generally refers to a SIM card that is inserted into a smart terminal and may be used for global roaming, this seed SIM card may be a physical card or be a soft card with little data traffic and low cost, and may provide data traffic for allocation of the cloud SIM card and the subsequent network registration of the cloud SIM card; the aforesaid cloud SIM card is a virtual SIM card which may provide data traffic for the subscribers in different service areas, and may dynamically allocate the SIM card in the area where it is located without generating a roaming charge.

In one preferable embodiment, the SIM card and the seed SIM card may share one SIM card slot.

In one preferable embodiment, before the step of performing the network registration for the seed SIM card, the method further includes:

searching for a network conforming to a network standard of the seed SIM card according to the network standard of the seed SIM card, and performing the network registration for the seed SIM card according to the searched network.

In one specific application, after the seed SIM card is activated, and before the network registration for the seed SIM card is performed, the network standard supported by the seed SIM card may be set through the terminal device, the network conforming to the network standard of the seed SIM card is searched according to the network standard of the seed SIM card, and the network registration for the seed SIM card is performed according to the network conforming to the network standard of the seed SIM card. Where the network standard supported by the seed SIM card includes but is not limited to LTE (Long Term Evolution), WCDMA (Wideband Code Division Multiple Access), GSM (Globe System for Mobile Communications), or a combination thereof.

At step S102, a data dialing is performed on the seed SIM card by the terminal device after the network registration for the seed SIM card is completed, and a cloud SIM card allocation request is submitted by the terminal device through the data traffic of the seed SIM card after the data dialing on the seed SIM card is successfully performed.

In one specific application, after the network registration for the seed SIM card is completed, the seed SIM card is only available to the terminal device, the data dialing is performed on the seed SIM card, after the data dialing is successfully performed, the data traffic is set on the seed SIM card by the terminal device, and the data traffic of the seed SIM card is used to connect to a cloud SIM card server to request for allocation of the cloud SIM card from the cloud SIM card server. The aforesaid allocation of cloud SIM card refers to that the terminal device uses the data traffic of the seed SIM card to request for the allocation of cloud SIM card from the cloud SIM card server, and one cloud SIM card is dynamically allocated to the terminal device by the cloud SIM card server; a cloud SIM card which corresponds to a country where the terminal device is located in is generally allocated to the terminal device.

By way of example but not limitation, after the activation process of the cloud SIM card is started, if the network registered by the seed SIM card is a Germany network, which means that the cloud SIM card of the country where the terminal device is located, which is requested through the data traffic of the seed SIM card and is allocated by the cloud SIM card server, is a cloud SIM card in Germany. If the terminal device moves to another country, for example, the terminal device moves from Germany to France, a cloud SIM card of a country where the terminal device is currently located, that is, a cloud SIM card in France, is requested from the cloud SIM card server again.

In one preferable embodiment, remedial measures may be made to solve the problem of failure if the network registration for the seed SIM card is failed or the data dialing of the seed SIM card is failed. The remedial measures include but is not limited to switching the network used for network registration for the seed SIM card, or replacing the seed SIM card with a new seed SIM card.

At step S103, the cloud SIM card is obtained by the terminal device from the cloud SIM card server according to the allocation of the cloud SIM card, the cloud SIM card is activated by the terminal device, and the network registration of the cloud SIM card is performed by the terminal device.

In one specific application, by applying the cloud SIM card allocation to the cloud SIM card server, the cloud SIM card allocated from the cloud SIM card server is acquired, and the cloud SIM card is activated in the card slot, then, after reading the relevant information of the cloud SIM card to be allocated, the cloud SIM card enters a preparation stage, the terminal device may set the network standard supported by the cloud SIM card, and search a network conforming to the network standard supported by the cloud SIM card according to the network standard of the cloud SIM card, and perform network registration for the cloud SIM card according to the network conforming to the network standard of the cloud SIM card network. If the cloud SIM card does not enter the preparation stage, a cloud SIM card allocation request may be resubmitted to the cloud SIM card server. Where the terminal device uses the data traffic of the seed SIM card to submit a cloud SIM card allocation request to the cloud SIM card server, after the cloud SIM card server allocates the cloud SIM card to the terminal device, the terminal device reads related information of the cloud SIM card allocated from the cloud SIM card server; the related information of the cloud SIM card includes but is not limited to ICCID (Integrated Integrated Circuit Card Identity), IMSI (international Mobile Subscriber Identity), some information of a network carrier, and the like.

In one preferable embodiment, after the step of activating the cloud SIM card by the terminal device and the before the step of performing network registration for the cloud SIM card by the terminal device, the method further includes:

switching the data traffic of the seed SIM card to the cloud SIM card, and performing the data dialing again on the seed SIM card.

In one preferable embodiment, if the current terminal device supports a dual path data traffic, that is, the data traffic are supported by two SIM cards at the same time, the data traffic of the seed SIM card can be switched to the cloud SIM card after the cloud SIM card is activated, the data dialing for the cloud SIM card can be performed in default after the network registration of the cloud SIM card is successfully performed subsequently; the data traffic of the cloud SIM card can be used after the data dialing on the cloud SIM card is successful; another path of data dialing on the seed SIM card needs to be performed again before the network registration of the cloud SIM card is performed, so that the data traffic of the seed SIM card can be used to implement the subsequent network registration of the cloud SIM card (e.g., performing the authentication on the cloud SIM card through the data traffic of the seed SIM card during the network registration process of the cloud SIM card).

By way of specific example but not limitation, there are many types of data dialing, parameters in data dialing includes APN, and the type of the APN may be adjusted according to different dialings; for example, the default data dialing may be set to default, the other path of data dialing may be set as DUN, the multimedia message dialing may be set as MMS, etc., and the aforesaid APN refers to a network access technology, which is a parameter that must be configured for surfing the Internet through the terminal device.

In one preferable embodiment, if data dialing for the cloud SIM card or the seed SIM card is failed, a remedial measure may be made to solve the problem of failure. Where remedial measures for the cloud SIM card include but are not limited to resubmitting allocation of cloud SIM card from the cloud SIM card server; the remedial measures for the seed SIM card include but are not limited to switching a network used for registering the seed SIM card or replacing the seed SIM card with a new seed SIM card.

At step S104, data dialing is performed on the cloud SIM card by the terminal device after the cloud SIM card network is successfully performed, and the seed SIM card is deactivated and the user's SIM card is activated by the terminal device after the data dialing is successfully performed.

In one specific application, after the cloud SIM card network is successfully performed, the data dialing is performed on the cloud SIM card; after the data dialing is successfully performed, the data traffic of the cloud SIM card can be used, then, the seed SIM card is deactivated and the SIM card is activated. It can be understood that, after sending a data dialing instruction from a modem of the terminal device to the network, the modem may obtain some information (e.g., IP) allocated by the network to the terminal device. Therefore, the data traffic of the terminal can be used only after the data dialing is successfully performed; since the seed SIM card has accomplished the tasks of allocation and authentication of cloud SIM card, so that the seed SIM card can be deactivated and the user's SIM card can be activated, the user's SIM card can be used to process a service thereof, and the service of the user's SIM card can be a personal service such as telephone, short message, etc.

In one preferable embodiment, if the network registration of the cloud SIM card is failed or the data dialing of the cloud SIM card data is failed, remedial measures may be made to solve the problem of failure. The remedial measures include but are not limited to resubmitting the allocation request of cloud SIM card to the cloud SIM card server.

In one preferable embodiment, if the current terminal device supports only a single channel of data traffic, that is, only one of two SIM cards supports the data traffic at the same time, in this situation, the data traffic is switched to the cloud SIM card and data dialing is performed after the network registration of the cloud SIM card is successfully performed; it can be understood that, the network registration of the cloud SIM card has been accomplished, the data traffic of the seed SIM card is unnecessary, the data traffic of the cloud SIM card is required subsequently, so that the data traffic is switched to the cloud SIM card.

In one preferable embodiment, if the current terminal device only supports the dual path data traffic, the seed SIM card is deactivated and the user's SIM card is activated after the network registration for the cloud SIM card is completed and the data dialing is successfully performed; after the network registration for the user's SIM card is successfully performed, and the data dialing on the user's SIM card is successfully performed, the dual path data of the cloud SIM card and the user's SIM card can be used at the same time; however, the data traffic is finally switched to the cloud SIM card to be used by a user terminal.

Embodiment Two

Figure 2:
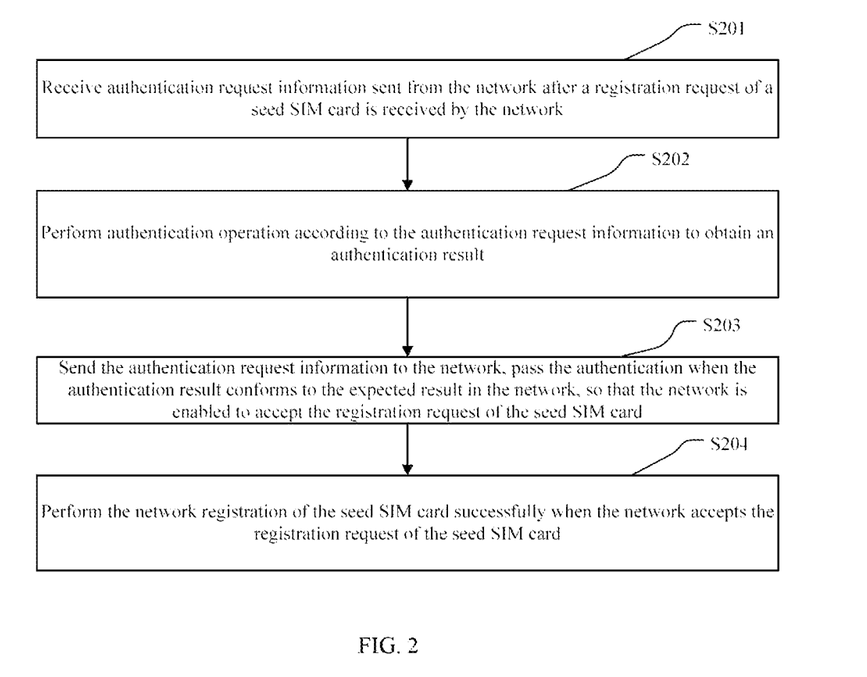
FIG. 2 illustrates a schematic flowchart of a network roaming method according to embodiment two of the present application.

In one preferable embodiment, as shown in FIG. 2, FIG. 2 is a schematic flowchart of a network roaming method according to embodiment two of the present application, said performing the network registration on the seed SIM card includes:

At step S201, after receiving a registration request sent by the seed SIM card by the network, a seed SIM card authentication request information sent by the network is obtained by the terminal device.

In one specific application, when network registration is performed on the seed SIM card, the terminal device sends a registration request of the seed SIM card to the network, after the network receives the registration request of the seed SIM card sent by the terminal device, the network sends the seed SIM card authentication request information to the terminal device, and the terminal device receives the seed SIM card authentication request information. It can be understood that when the network registration for the seed SIM card is performed, the network will perform authentication on the seed SIM card, and passes the registration request of the seed SIM card only if the authentication of the seed SIM card is passed, and the network registration for the seed SIM card is successful.

At step S202, an authentication operation is performed on the seed SIM card according to the authentication request information and authentication result of the seed SIM card is obtained.

In one specific application, the terminal device performs a relevant authentication operation according to the authentication request information sent by the network, and obtains an authentication result. Where the authentication operation is bidirectionally performed, which aims at: in one aspect, verifying whether the seed SIM card in the terminal device is permitted to access the network; in another aspect, verifying whether the network is legitimate.

By way of specific example but not limitation, the seed SIM card may be a preset soft card or a physical SIM card; when the seed SIM card is a soft card, related authentication algorithm of the soft card is stored in an application program package of the terminal device, after the modem of the terminal device obtains the authentication request information sent by the network, the modem may send the acquired authentication request information to the application program package in the terminal device, and the application program package of the terminal device will execute the authentication algorithm according to the authentication request information, and obtain the authentication result after execution of the authentication algorithm.

At step S203, the authentication result is sent to the network, when the authentication result conforms to an expected result of the network, the authentication is successful, so that the network passes the registration request sent by the seed SIM card.

At step S204, the network registration for the seed SIM card is successfully performed by the terminal device after the network passes the registration request sent by the seed SIM card.

In one specific application, after the authentication result of the authentication operation in the terminal device is obtained, the authentication result is sent to the modem in the terminal device, the modem sends the authentication result to the network, the network obtains the authentication result, and determines whether the authentication result conforms to the expected result thereof, if the authentication result conforms to the expected result of the network, the authentication succeeds, if the network passes the registration request of the seed SIM card, the seed SIM card can be registered successfully.

In one preferable embodiment, if the network registration for the seed SIM card is failed, remedial measures may be made to solve the problem of failure. The remedial measures include but are not limited to switching the network used for network registration for the seed SIM card, or replacing the seed SIM card with a new seed SIM card.

Embodiment Three

Figure 3:
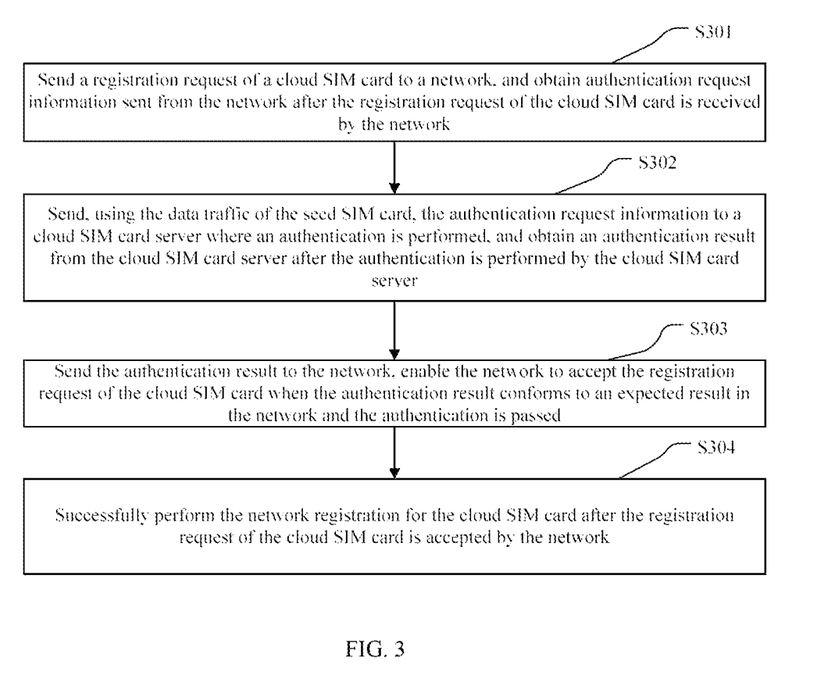
FIG. 3 illustrates a schematic flowchart of a network roaming method according to embodiment three of the present application.

In one preferable embodiment, as shown in FIG. 3, FIG. 3 is a schematic flowchart of a network roaming method according to embodiment three of the present application, said performing the network registration for the cloud SIM card includes:

At step S301, a registration request of a cloud SIM card is sent to the network by the terminal device, after the registration request of the cloud SIM card is received by the network, the authentication request information sent by the network is obtained by the terminal device.

In one specific application, when the network registration is performed by the cloud SIM card, the terminal device sends a registration request of the cloud SIM card to the network, the network sends the authentication request information to the terminal device after receiving the registration request of the cloud SIM card sent by the terminal device, and the authentication request information is obtained by the terminal device. It can be understood that when the network registration of the cloud SIM card is performed, the network will perform authentication on the cloud SIM card, the network can receive the registration request of the cloud SIM card and the registration of the cloud SIM card is successful only if the authentication of the cloud SIM card is passed.

At step S302, the authentication request information is sent from the terminal device to the cloud SIM card server for authentication through the data traffic of the seed SIM card, and the authentication result is obtained by the terminal device after the authentication of the cloud SIM card has been performed the cloud SIM card server.

In one specific application, the terminal sends the authentication request information to the cloud SIM card server through the data traffic of the seed SIM card after receiving the authentication request information about the cloud SIM card, the cloud SIM card server performs authentication on the cloud SIM card to obtain an authentication result of the cloud SIM card, and sends the authentication result of the cloud SIM card to the terminal device.

At step S303, the authentication result of the cloud SIM card is sent to the network by the terminal device, when the authentication result of the cloud SIM card conforms to the expected result of the network, the authentication is successful, so that the network passes the registration request of the cloud SIM card.

At step S304, the network registration of the cloud SIM card is passed after the network receives the cloud SIM card registration request.

In one specific application, after the terminal device obtains the authentication result of the cloud SIM card, the terminal device sends the authentication result of the cloud SIM card to the network, the network obtains the authentication result about the cloud SIM card, and make a determination according to the expected result thereof; if the authentication result of the cloud SIM card conforms to the expected result of the network itself, it indicates that the authentication is passed; if the network passes the registration request of the cloud SIM card, the cloud SIM card can be registered successfully.

In one preferable embodiment, if the network registration of the cloud SIM card is failed, remedial measures can be made to solve the problem of failure. The remedial measures of the cloud SIM card include but is not limited to resubmitting a cloud SIM card allocation request to the cloud SIM card server.

Embodiment Four

Figure 4:
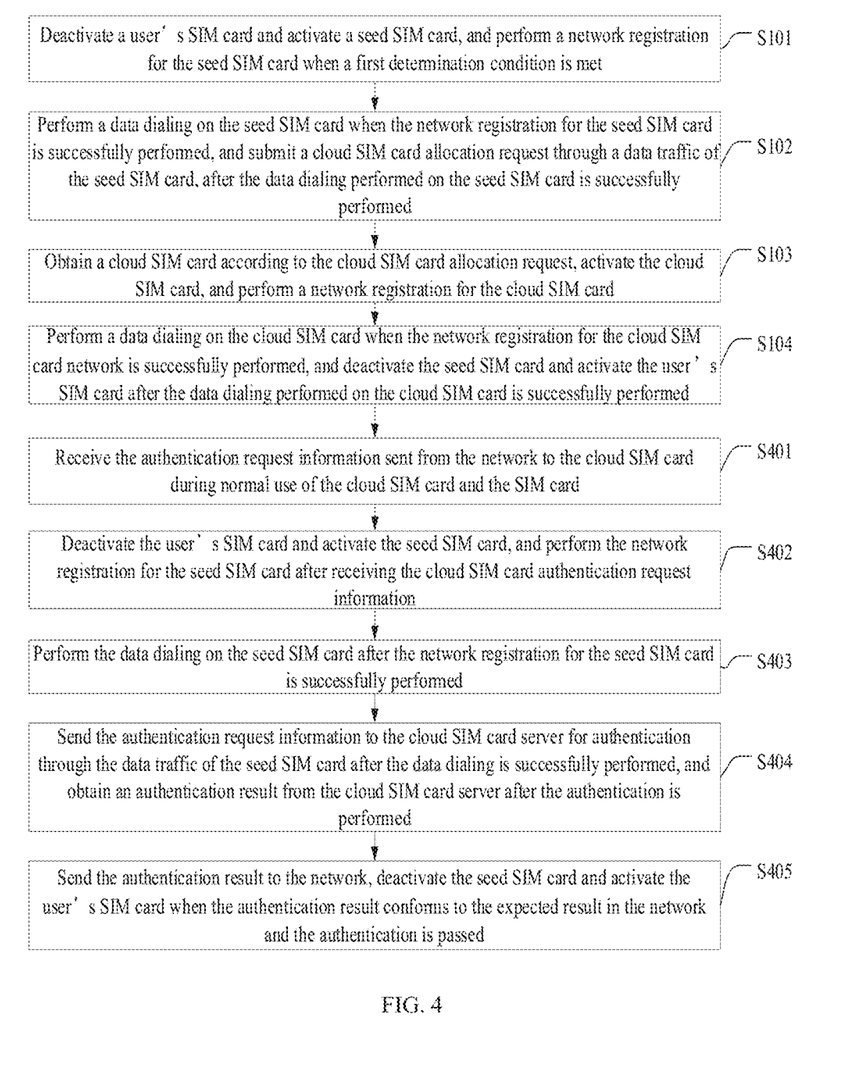
FIG. 4 illustrates a schematic flowchart of a network roaming method according to embodiment four of the present application.

In one preferable embodiment, as shown in FIG. 4, FIG. 4 is a schematic flowchart of a network roaming method according to embodiment four of the present application. After the step of performing the data dialing on the cloud SIM card after cloud SIM card network is successfully performed, and deactivating the seed SIM card and activating the user's SIM card after the data dialing is successfully performed, the method further includes:

At step S401, an authentication request information sent from the network is received by the terminal device during normal use of the cloud SIM card and the user's SIM card.

In one specific application, in the normal use process of the cloud SIM card and the SIM card, the network may request to perform authentication on the cloud SIM card again, and the terminal device will obtain authentication request information of the cloud SIM card sent from the network again. The repeated authentication is required by the network, if the terminal device does not respond to the authentication request of the cloud SIM card, the network cannot be used continuously, and the number of times of authentications may be different according to different terminal devices and different networks.

In one preferable embodiment, if the current terminal device only supports a single path data traffic, that is, the data traffic is only supported by one single SIM card at the same time, the cloud SIM card is deactivated after the authentication request information is obtained, and the aforesaid steps S101-S104 are performed.

At step S402, after receiving the authentication request information, the user's SIM card is deactivated and the seed SIM card is activated by the terminal device, and network registration for the seed SIM card is performed by the terminal device.

In one specific application, after the terminal device obtains the authentication request information of the cloud SIM card sent from the network, clue to the fact that the data traffic of the seed SIM card needs to be used for the subsequent authentication of the cloud SIM card, so that the user's SIM card is deactivated and the seed SIM card is activated; after the seed SIM card is activated, the terminal device may perform corresponding settings according to the network standard supported by the seed SIM card, and search out the network conforming to the network standard of the seed SIM card according to the network standard of the seed SIM card, thereby performing the network registration for the seed SIM card.

At step S403, a data dialing is performed on the seed SIM card by the terminal device after the seed SIM card is successfully performed.

In one specific application, after the network registration of the seed SIM card is successfully performed, the data dialing is performed on the seed SIM card; it can be understood that, the data traffic of the seed SIM card can be used for data transmission for authentication of the cloud SIM card after the data dialing of the seed SIM card data is successfully performed.

At step S404, after the data dialing is successfully performed, the authentication request information of the cloud SIM card is sent from the terminal device to the cloud SIM card server for authentication through the data traffic of the seed SIM card, and the authentication result of the cloud SIM card is obtained after authentication of the cloud SIM card has been performed by the cloud SIM card server.

At step S405, the authentication result of the cloud SIM card is sent to the network from the terminal device, when the authentication result of the cloud SIM card conforms to the expected result of the network, the authentication is passed, the seed SIM card is deactivated and the user's SIM card is activated by the terminal device.

In one specific application, the authentication request information of the cloud SIM card sent by the network and obtained by the terminal device is sent to the cloud SIM card server through the data traffic of the seed SIM card, the cloud SIM card server performs corresponding authentication on the cloud SIM card, obtains an authentication result of the cloud SIM card and sends the authentication result of the cloud SIM card to the network, and the network obtains the authentication result of the cloud SIM card, and makes a determination of the authentication according to the expected result thereof. If the authentication of the cloud SIM card conforms to the expected result, it indicates that the authentication of the cloud SIM card is passed, when the authentication of the cloud SIM card is passed, the cloud SIM card can be continued to be used; if the authentication result of the cloud SIM card is failed, the cloud SIM card cannot be continued to be used, so that when the authentication of the cloud SIM card is passed, data dialing is performed on the cloud SIM card; after the data dialing performed on the cloud SIM card is successfully performed, the seed SIM card is deactivated and the user's SIM card is activated.

In one preferable embodiment, if the data dialing on the cloud SIM card is failed, the authentication of the cloud SIM card is failed, the data dialing performed on the seed SIM card is failed, or the network registration of the seed SIM card is failed, remedial measures may be made to solve the problem of failure. The remedial measures of the cloud SIM card include but are not limited to: resubmitting a cloud SIM card allocation request to the cloud SIM card server; the remedial measures of the seed SIM card include but are not limited to: switching a network used for network registration of the seed SIM card or replacing the seed SIM card with a new seed SIM card.

According to this embodiment of the present application, when the first determination condition is met, the user's SIM card is deactivated and the seed SIM card is activated, and the network registration for the seed SIM card is performed; after network registration for the seed SIM card is successfully performed, the data dialing is performed on the seed SIM card; after the data dialing on the seed SIM card is successfully performed, a cloud SIM card allocation request is submitted according to the data traffic of the seed SIM card, the cloud SIM card is obtained and activated, and the network registration for the cloud SIM card is performed; after the network registration for the cloud SIM card is completed, the data dialing is performed on the cloud SIM card, and after the data dialing on the cloud SIM card is successfully performed, the seed SIM card is deactivated and the user's SIM card is activated. In the aforesaid process, the seed SIM card is used to provide data traffic service for the allocation and the network registration of the cloud SIM card, so that the cloud SIM card is activated, and a roaming charge during roaming of the mobile network is avoided.

It should be understood that, the values of serial numbers of the steps in the aforesaid embodiments do not indicate an order of execution sequences of the steps; instead, the execution sequences of the steps should be determined by functionalities and internal logic of the steps, and thus shouldn't be regarded as limitation to an implementation process of the embodiment of the present application.

Embodiment Five

Figure 5:
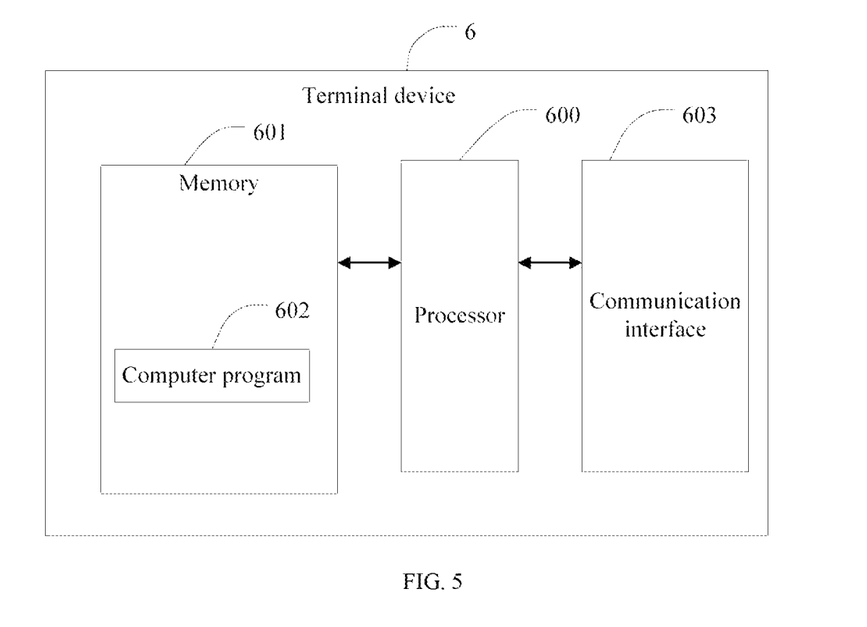
FIG. 5 illustrates a schematic structural block diagram of a terminal device provided by one embodiment of the present application.

As shown in FIG. 5, a terminal device 6 is further provided In one preferable embodiment of the present application, this terminal device 6 includes a processor 600, a memory 601 coupled with the processor 600, and a computer program 602 (e.g., a network roaming program) stored in the memory 601 and executed by the processor 600. The processor 600 is configured to execute the computer program 602 in the memory 601 so as to:

deactivate a user's SIM card and activate a seed SIM card, and perform a network registration for the seed SIM card when a first determination condition is met;

perform a data dialing on the seed SIM card when the network registration for the seed SIM card is completed, and submit a cloud SIM card allocation request from the terminal device to a cloud SIM card server through a data traffic of the seed SIM card, after the data dialing performed on the seed SIM card is successfully performed;

obtain a cloud SIM card according to a cloud SIM card allocation result from the cloud SIM card server, activate the cloud SIM card, and perform a network registration for the cloud SIM card; and perform a data dialing on the cloud SIM card when the network registration for the cloud SIM card is completed, and deactivate the seed SIM card and activate the user's SIM card, after the data dialing performed on the cloud SIM card is successfully performed.

Furthermore the processor 600 is further configured to:
send a registration request of a cloud SIM card to a network and receive cloud SIM card authentication request information sent from the network by the terminal device;
send the cloud SIM card authentication request information to the cloud SIM card server through the data traffic of the seed SIM card to perform an authentication on the cloud SIM card, and obtain a cloud SIM card authentication result from the cloud SIM card server after the authentication on the cloud SIM card is performed by the cloud SIM card server;
send the authentication result of the cloud SIM card to the network in order that the network passes the registration request of the cloud SIM card when the authentication result of the cloud SIM card conforms to an expected result of the network; and
complete the network registration for the cloud SIM card after the registration request of the cloud SIM card is passed by the network.

Furthermore, the processor 600 is further configured to switch the data traffic of the seed SIM card to the cloud SIM card and perform a data dialing on the seed SIM card, after the cloud SIM card is activated by the terminal device.

Furthermore, after the seed SIM card is deactivated and the user's SIM card is activated after the data dialing performed on the cloud SIM card is successfully performed, the processor 600 is further configured to:
receive the cloud SIM card authentication request information sent from the network during normal use of the cloud SIM card and the user's SIM card;
deactivate the user's SIM card and activate the seed SIM card, and perform the network registration for the seed SIM card after receiving the cloud SIM card authentication request information sent from the network;
perform the data dialing on the seed SIM card after the network registration for the seed SIM card is completed;
send the cloud SIM card authentication request information to the cloud SIM card server through the data traffic of the seed SIM card so as to perform an authentication on the cloud SIM card after the data dialing is successfully performed, and obtain an authentication result of the cloud SIM card from the cloud SIM card server; and
send the authentication result of the cloud SIM card to the network, deactivate the seed SIM card and activate the user's SIM card when the authentication result of the cloud SIM card conforms to the expected result of the network and the authentication on the cloud SIM card is passed by the cloud SIM card server.

The terminal device 6 can be a computing device such as a desktop computer, a laptop computer, a palm computer, a cloud server, etc. The terminal device 6 can include but is not limited to: the processor 600, the memory 601 and a communication interface 603. A person of ordinary skill in the art can understand that, FIG. 5 is only one example of the terminal device 6, but should not be constituted as limitation to the terminal device 6, more or less components than the components shown in FIG. 5 may be included; as an alternative, some components or different components may be combined; for example, the terminal device 6 can also include an input and output device, a network access device, a bus, etc.

The so-called processor 600 may be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, as an alternative, the processor can also be any conventional processor, and the like.

The memory 601 may be an internal storage unit of the terminal device 6, such as a hard disk or a memory of the terminal device 6. The memory 601 can also be an external storage device of the terminal device 6, such as a plug-in hard disk, a SMC (Smart Media Card), a SD (Secure Digital) card, a FC (Flash Card) equipped on the terminal device 6. Furthermore, the memory 601 may not only include the internal storage unit of the terminal device 6 but also include the external memory of the terminal device 6. The memory 601 is configured to store the computer program and other procedures and data needed by the terminal device 6. The memory 601 can also be configured to store data that has been output or being ready to be output temporarily.

In the aforesaid embodiments, the various embodiments are emphasized in contents respectively, regarding a part of one embodiment which has not been described or disclosed in detail, reference can be made to relevant descriptions in other embodiments.

The person of ordinary skill in the art may understand that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

The non-transitory computer readable medium can include: any physical equipment or device that can carry the computer program codes, recording medium, USB flash disk, mobile hard disk, hard disk, optical disk, computer memory, ROM (Read-Only Memory), RAM (Random Access Memory).

The embodiments described above are only intended to explain but not to limit the technical solutions of the present application. Although the present application has been explained in detail with reference to these embodiments, a person of ordinary skilled in the art can understand that, the technical solutions disclosed in the embodiments can also be amended, some technical features in the technical solutions can also be equivalently replaced; the amendments or the equivalent replacements don't cause the essence of the corresponding technical solutions to be deviated from the spirit and the scope of the technical solutions in the embodiments of the present application, and thus should all be included in the protection scope of the present application.

What is claimed is:

1. A network roaming method implemented by a terminal device, comprising steps of:
deactivating a user's SIM card and activating a seed SIM card, and performing a network registration for the seed SIM card by the terminal device when a first determination condition is met;
performing a data dialing on the seed SIM card by the terminal device when the network registration for the seed SIM card is completed, and submitting a cloud SIM card allocation request from the terminal device to a cloud SIM card server through a data traffic of the seed SIM card, after the data dialing performed on the seed SIM card is successfully performed;

obtaining a cloud SIM card by the terminal device according to a cloud SIM card allocation result from the cloud SIM card server, activating the cloud SIM card, and performing a network registration for the cloud SIM card by the terminal device; and performing a data dialing on the cloud SIM card by the terminal device when the network registration for the cloud SIM card is completed, and deactivating the seed SIM card and activating the user's SIM card by the terminal device after the data dialing performed on the cloud SIM card is successfully performed.

2. The network roaming method according to claim 1, wherein the step of performing the network registration for the cloud SIM card by the terminal device comprises:

sending a registration request of the cloud SIM card to a network and receiving cloud SIM card authentication request information sent from the network by the terminal device;

sending, by the terminal device, through the data traffic of the seed SIM card, the cloud SIM card authentication request information to the cloud SIM card server to perform an authentication on the cloud SIM card, and obtaining a cloud SIM card authentication result from the cloud SIM card server by the terminal device after the authentication on the cloud SIM card is performed by the cloud SIM card server;

sending, by the terminal device, the authentication result of the cloud SIM card to the network in order that the network passes the registration request of the cloud SIM card when the authentication result of the cloud SIM card conforms to an expected result of the network; and completing the network registration for the cloud SIM card after the registration request of the cloud SIM card is passed by the network.

3. The network roaming method according to claim 1, wherein after said activating the cloud SIM card by the terminal device and before said performing the network registration for the cloud SIM card by the terminal device, the method further comprises:

switching the data traffic of the seed SIM card to the cloud SIM card, and performing the data dialing on the seed SIM card again by the terminal device.

4. The network roaming method according to claim 1, wherein after the step of performing the data dialing on the cloud SIM card by the terminal device when the network registration for the cloud SIM card is successfully performed, and deactivating the seed SIM card and activating the user's SIM card by the terminal device after the data dialing performed on the cloud SIM card is successfully performed, the method further comprises:

receiving, by the terminal device, the cloud SIM card authentication request information sent from the network during normal use of the cloud SIM card and the SIM card;

deactivating the user's SIM card and activating the seed SIM card by the terminal device, and performing the network registration for the seed SIM card after receiving the cloud SIM card authentication request information sent from the network;

performing the data dialing on the seed SIM card by the terminal device after the network registration for the seed SIM card is completed;

sending, by the terminal device, the cloud SIM card authentication request information to the cloud SIM card server through the data traffic of the seed SIM card so as to perform an authentication on the cloud SIM card after the data dialing on the seed SIM card is successfully performed, and obtaining an authentication result of the cloud SIM card from the cloud SIM card server; and sending the authentication result of the cloud SIM card to the network by the terminal device, deactivating the seed SIM card and activating the user's SIM card by the terminal device when the authentication result of the cloud SIM card conforms to the expected result of the network and the authentication on the cloud SIM card is passed by the cloud SIM card server.

5. A terminal device, comprising a processor, a memory coupled with the processor, and a computer program stored in the memory and executable by the processor, wherein when executing the computer program stored in the memory, the processor is configured to implement steps of:

deactivating a user's SIM card and activate a seed SIM card, and performing a network registration for the seed SIM card when a first determination condition is met;

performing a data dialing on the seed SIM card when the network registration for the seed SIM card is completed, and submitting a cloud SIM card allocation request from the terminal device to a cloud SIM card server through a data traffic of the seed SIM card, after the data dialing performed on the seed SIM card is successfully performed;

obtaining a cloud SIM card by the terminal device according to a cloud SIM card allocation result from the cloud SIM card server, activating the cloud SIM card, and performing a network registration for the cloud SIM card; and performing a data dialing on the cloud SIM card when the network registration for the cloud SIM card is completed, and deactivating the seed SIM card and activating the user's SIM card after the data dialing performed on the cloud SIM card is successfully performed.

6. The terminal device according to claim 5, wherein the processor is particularly configured to implement the step of performing the network registration for the cloud SIM card by the terminal device by:

sending a registration request of a cloud SIM card to a network and receiving cloud SIM card authentication request information sent from the network by the terminal device;

sending the cloud SIM card authentication request information to the cloud SIM card server through the data traffic of the seed SIM card to perform an authentication on the cloud SIM card, and obtaining a cloud SIM card authentication result from the cloud SIM card server after the authentication on the cloud SIM card is performed by the cloud SIM card server;

sending the authentication result of the cloud SIM card to the network in order that the network passes the registration request of the cloud SIM card, when the authentication result of the cloud SIM card conforms to an expected result of the network; and completing the network registration for the cloud SIM card after the registration request of the cloud SIM card is passed by the network.

7. The terminal device according to claim 5, wherein when executing the computer program stored in the memory, the processor is further configured to implement a step of switching the data traffic of the seed SIM card to the cloud SIM card and perform the data dialing on the seed SIM card after the cloud SIM card is activated and before the network registration is performed for the cloud SIM card.

8. The terminal device according to claim 5, wherein after the seed SIM card is deactivated, and the SIM card is activated after the data dialing performed on the cloud SIM card is successfully performed, the processor is further configured to implement steps of:
receiving the cloud SIM card authentication request information sent from the network during normal use of the cloud SIM card and the SIM card;
deactivating the user's SIM card and activating the seed SIM card, and performing the network registration for the seed SIM card after receiving the cloud SIM card authentication request information sent from the network;
performing the data dialing on the seed SIM card after the network registration for the seed SIM card is completed;
sending the cloud SIM card authentication request information to the cloud SIM card server through the data traffic of the seed SIM card so as to perform an authentication on the cloud SIM card after the data dialing is successfully performed, and obtain an authentication result of the cloud SIM card from the cloud SIM card server; and
sending the authentication result of the cloud SIM card to the network, deactivating the seed SIM card and activating the user's SIM card when the authentication result of the cloud SIM card conforms to the expected result of the network and the authentication on the cloud SIM card is passed by the cloud SIM card server.

9. A non-transitory computer-readable storage medium which stores a computer program, that, when executed by a processor, causes the processor to implement following steps, comprising:
deactivating a user's SIM card and activating a seed SIM card, and performing a network registration for the seed SIM card when a first determination condition is met;
performing a data dialing on the seed SIM card when the network registration for the seed SIM card is completed, and submitting a cloud SIM card allocation request to a cloud SIM card server through a data traffic of the seed SIM card, after the data dialing performed on the seed SIM card is successfully performed;
obtaining a cloud SIM card according to a cloud SIM card allocation result from the cloud SIM card server, activating the cloud SIM card, and performing a network registration for the cloud SIM card; and
performing a data dialing on the cloud SIM card when the network registration for the cloud SIM card is completed, and deactivating the seed SIM card and activating the user's SIM card after the data dialing performed on the cloud SIM card is successful.

* * * * *